United States Patent
Xue et al.

(10) Patent No.: US 7,360,464 B2
(45) Date of Patent: Apr. 22, 2008

(54) VARIABLE RATE IMPACT AND OSCILLATION ABSORBER IN STARTER MOTORS

(75) Inventors: Wei Xue, Northville, MI (US); Ravi Atluru, Westland, MI (US); Martin Jastrzembowski, Brighton, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 675 days.

(21) Appl. No.: 10/931,825

(22) Filed: Sep. 1, 2004

(65) Prior Publication Data

US 2005/0126318 A1    Jun. 16, 2005

Related U.S. Application Data

(60) Provisional application No. 60/529,495, filed on Dec. 15, 2003.

(51) Int. Cl.
*F02N 1/00* (2006.01)
(52) U.S. Cl. .................... 74/7 E; 475/346; 475/347
(58) Field of Classification Search ............. 74/6, 74/7 E; 475/331, 346, 347; 192/55, 42
See application file for complete search history.

(56) References Cited

U.S. PATENT DOCUMENTS

| | | | |
|---|---|---|---|
| 3,788,151 A | 1/1974 | Campau | |
| 4,561,316 A | 12/1985 | Bolz et al. | |
| 4,779,470 A | 10/1988 | Morita et al. | |
| 4,974,463 A | 12/1990 | Luiki | |
| 5,127,279 A | 7/1992 | Barthruff | |
| 5,323,663 A | 6/1994 | Ohgi et al. | |
| 5,377,560 A * | 1/1995 | Schierling et al. | ....... 464/68.92 |
| 5,533,415 A | 7/1996 | Ackermann et al. | |
| 5,545,089 A | 8/1996 | Kirschey | |
| 5,857,380 A | 1/1999 | Kajino et al. | |
| 5,905,309 A | 5/1999 | Ohmi et al. | |
| 5,905,310 A | 5/1999 | Nagao | |
| 6,490,940 B1 | 12/2002 | Izquierdo et al. | |
| 6,664,652 B2 * | 12/2003 | Chane-Waye | ............. 290/38 R |
| 6,993,989 B2 * | 2/2006 | Oomura et al. | ................ 74/7 E |
| 2003/0177852 A1 | 9/2003 | Kim et al. | |
| 2003/0200826 A1 | 10/2003 | Oomura et al. | |
| 2006/0060009 A1 * | 3/2006 | Oomura et al. | ................ 74/7 E |

FOREIGN PATENT DOCUMENTS

| | | |
|---|---|---|
| EP | 0 375 396 A1 | 6/1990 |
| JP | 405052166 A | 3/1993 |

* cited by examiner

*Primary Examiner*—David M Fenstermacher
(74) *Attorney, Agent, or Firm*—MacMillan Sobanski & Todd, LLC

(57) ABSTRACT

A starter motor is provided having a starter motor housing with an electric motor mounted therein. A stationary gear base mounted onto the starter motor housing and includes a plurality of pockets formed therein and spaced thereabout. A stationary gear is rotatably mounted within the stationary gear base for limited rotational movement and includes a plurality of legs that extend into the pockets. One or more variable rate dampening members are positioned within the pockets, circumferentially between the legs of the stationary gear and inner walls of the pockets. The variable rate dampening members provide variable rate dampening such that when the starter motor experiences high frequency, low amplitude oscillations the dampening members provide a first spring rate and when the starter motor experiences a high amplitude impact for a short duration of time, the dampening members provide a second spring rate that is stronger than the first spring rate.

12 Claims, 3 Drawing Sheets

VARIABLE RATE IMPACT AND OSCILLATION ABSORBER IN STARTER MOTORS

CROSS-REFERENCE TO RELATED PATENT APPLICATIONS

This patent application claims the benefit of U.S. provisional patent application 60/529,495 filed Dec. 15, 2003.

BACKGROUND OF THE INVENTION

The subject matter of the present application relates generally to an electric starter motor. More specifically, the subject matter of the present application relates to a starter motor having variable rate dampening.

The application of diesel engines having a dual mass flywheel (DMF) has become more and more popular in the automotive industry due to environmental exhaust restrictions and the demand for smooth powertrain operation. To crank a diesel engine with a DMF, an electrical starter motor is subjected to very severe oscillation and impact since the DMF creates oscillation to the starter gear drive train. These oscillations and impacts can occur as either low frequency high impact loads, or high frequency low impact loads. These loads can cause pre-mature starter failure.

Starter motors with dampening members can dampen one or the other, but not both types of loads. Therefore, it is desirable to provide a starter motor that includes variable rate dampening members that will provide dampening for both high impact low frequency loads and low impact high frequency loads.

SUMMARY OF THE INVENTION

A starter motor according to the principals of the present invention includes a starter motor housing with an electric motor mounted therein. A stationary gear base is mounted onto the starter housing and includes a plurality of pockets formed therein and spaced circumferentially thereabout. A stationary gear is rotatably mounted within the stationary gear base. The stationary gear includes a plurality of radially extending portions, or legs, that extend into the pockets. Also positioned within the pockets, circumferentially between the legs and inner walls of the pockets, are variable rate dampening members. The variable rate dampening members provide variable rate dampening such that when the starter motor experiences high frequency, low amplitude oscillations the dampening members provide a first spring rate, and when the starter motor experiences a high amplitude impact for a short duration of time, the dampening members provide a second spring rate that is stronger than the first spring rate.

In one aspect, the starter motor includes an output shaft that is interconnected with the stationary gear through a planetary gear set. The output shaft includes a plurality of axially extending pins and the planetary gear set includes a plurality of planet gears, one planet gear mounted rotatably onto each pin. The planet gears mesh with the stationary gear, thereby interconnecting the stationary gear to the output shaft.

In another aspect, the starter motor includes a sun gear positioned centrally within and meshing with each of the planet gears. The sun gear is attached to an armature shaft of the electric motor, thereby interconnecting the electric motor and the stationary gear such that oscillations and impacts experienced by the electric motor are absorbed by the dampening members.

In still another aspect, a single variable rate dampening member is positioned adjacent one side of each of the legs of the stationary gear thereby providing dampening in a single rotational direction.

In yet another aspect, a pair of variable rate dampening members are positioned on opposite sides of each of the radially extending portions of the stationary gear thereby providing dampening in both rotational directions.

DESCRIPTION OF THE DRAWINGS

The above, as well as other aspects of the present application, will become readily apparent to those skilled in the art from the following detailed description of the embodiments, when considered in the light of the accompanying drawings in which.

DESCRIPTION OF THE PREFERRED EMBODIMENT

Figure 1:
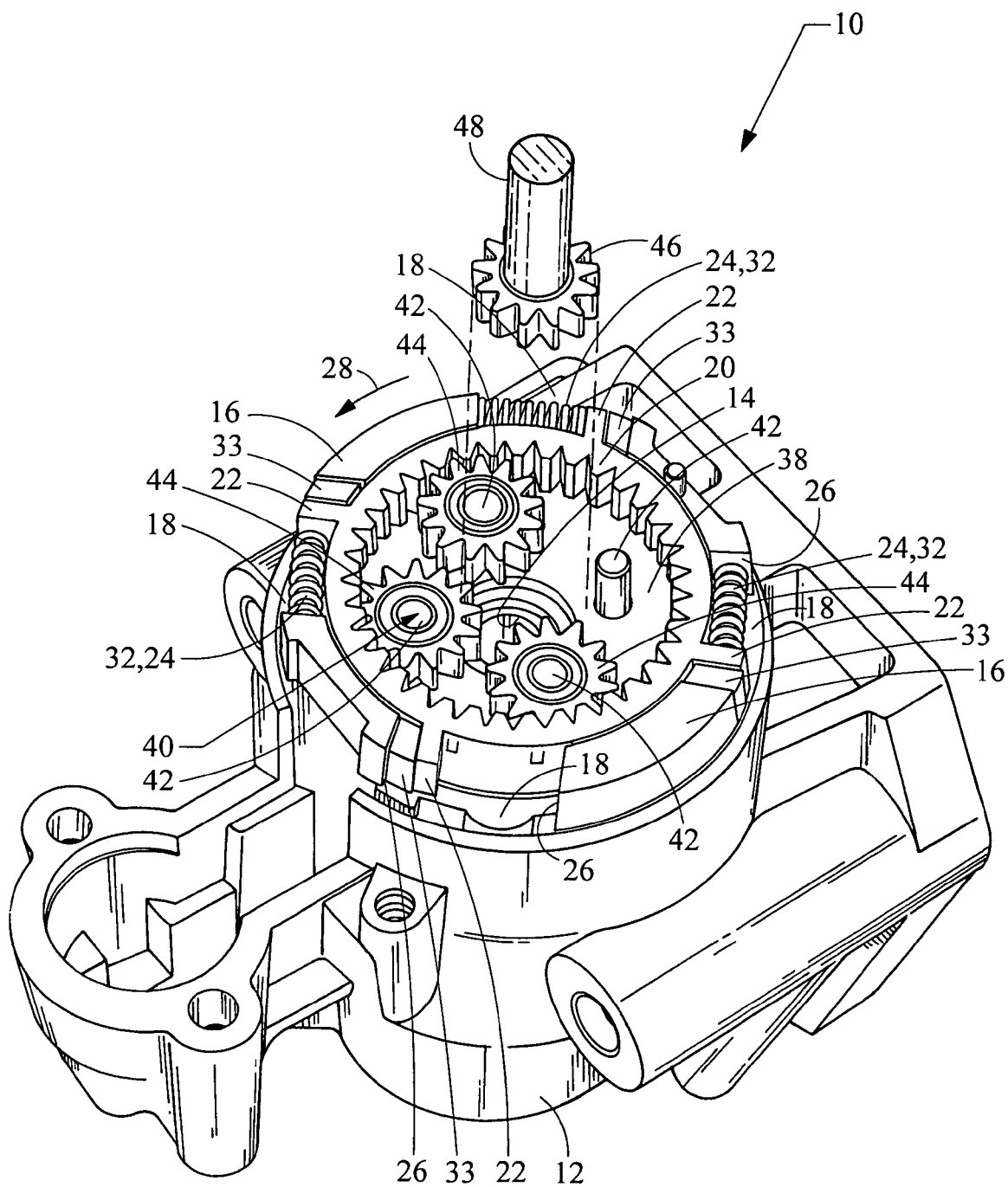
FIG. 1 is a partially exploded perspective view of a starter motor having features of the present application wherein variable rate coil springs provide dampening in one rotational direction and a rubber cushion provides dampening in the opposite direction.

Referring to FIG. 1, a starter motor having features of the present invention is shown generally at 10. The starter motor 10 generally includes a starter motor housing 12 and an electric motor 14 is mounted therein. A stationary gear base 16 is mounted onto the starter housing 12 and includes a plurality of pockets 18 formed therein and spaced circumferentially thereabout. A stationary gear 20 is rotatably mounted within the stationary gear base 16 and includes a plurality of radially extending portions 22. One radially extending portion 22 extends into each of the pockets 18 formed within the stationary gear base 16, such that the stationary gear 20 has limited rotational movement within the stationary gear base 16.

Also positioned within the pockets 18 are variable rate dampening members, one per pocket as shown in FIG. 1. For illustrative purposes, the variable rate dampening member 24 is omitted from the pocket 18 at the six o-clock position in FIG. 1. The pockets 18 define two inner walls 26, and the dampening members 24 are placed circumferentially between the radially extending portions 22 of the stationary gear 20 and one of the inner walls 26 of the pockets 18.

As shown, the pockets 18 within the stationary gear base 16 and the radially extending portions 22 of the stationary gear 20 are spaced evenly about the stationary gear base 16 and the stationary gear 20, respectively. More particularly, the starter motor 10 is shown with four pockets 18 evenly spaced circumferentially about the stationary gear base 16 and the stationary gear 20 includes four radially extending portions 22 evenly spaced circumferentially thereabout. It should be noted, however, that a starter motor 10 according to the principals of the present application could include any appropriate number of pockets 18 and radially extending portions 22, those also not necessarily being spaced evenly about the stationary gear 16 and stationary gear base 20.

Referring again to FIG. 1, the starter motor 10 includes an output shaft 38 that is interconnected with the stationary gear 16 through a planetary gear set 40. The output shaft 38 includes a plurality of axially extending pins 42. The planetary gear set 40 includes a plurality of planet gears 44, one planet gear 44 being mounted rotatably onto one of four pins 42 axially extending from the output shaft 38. For illustrative purposes, the planet gear 44 is not shown on the pin 42 located generally at the three o-clock position in FIGS. 1, 2, and 3. External teeth on the planet gears 44 mesh with internal teeth on the stationary gear 20, which is this provided as a ring gear, thereby interconnecting the stationary gear 20 to the output shaft 38 through the planet gears 44.

A sun gear 46 is positioned centrally within and meshes with each of the planet gears 44. The sun gear 46 is formed onto the armature shaft 48 of the electric motor 14, thereby interconnecting the electric motor 14 to the stationary gear 16, through the sun gear 46 and the planet gears 44. Torque and rotation generated by the electric motor 14 is therefore transmitted to the output shaft 38 through the sun gear 46 and the planet gears 44. Oscillation and impact is applied to the output shaft 38 inside the starter motor 10. The variable rate dampening members 24, 32, 34 of the various embodiments will absorb the transmitted energy by their deformation during oscillation and impact.

Figure 2:
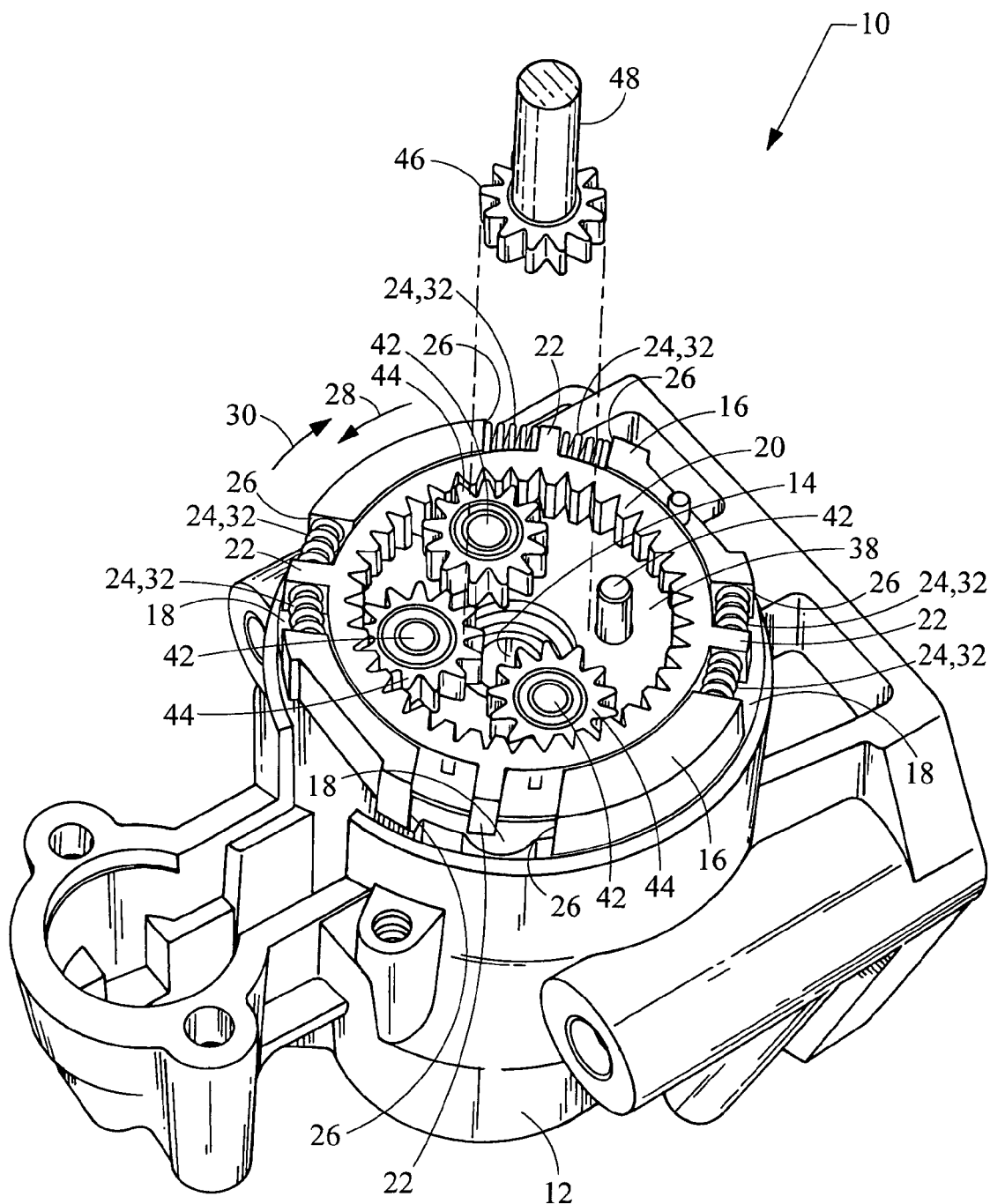
FIG. 2 is a view, similar to FIG. 1, of an alternative embodiment wherein variable rate coil springs provide dampening in both rotational directions.

As shown in FIG. 1, the variable rate dampening members 24 are positioned adjacent only one side of the radially extending portions 22 of the stationary gear 20. This provides dampening for impacts in one direction, specifically, the direction indicated by arrow 28. Alternatively, as shown in FIG. 2, the starter motor 10 can include pairs of variable rate dampening members 24, one member 24 being positioned on opposite sides of each of the radially extending portions 22, thereby providing dampening in both rotational directions, as indicated by arrows 28 and 30. For illustrative purposes, the variable rate dampening members 24 are omitted from the pocket 18, generally located at the six o-clock position in FIG. 2.

As shown in FIGS. 1 and 2, the variable rate dampening members 24 are variable rate coil springs 32. In FIG. 1, a variable rate coil spring 32 is placed adjacent only one side of each of the radially extending portions 22 of the stationary gear 20 and a rubber cushion 33 is placed opposite the radially extending portions, and in FIG. 2, a variable rate coil spring 32 is placed adjacent both sides of each of the radially extending portions 22 of the stationary gear 20. Alternatively, a different variable rate dampening member 24, such as a clip spring 34 could be used.

Figure 3:
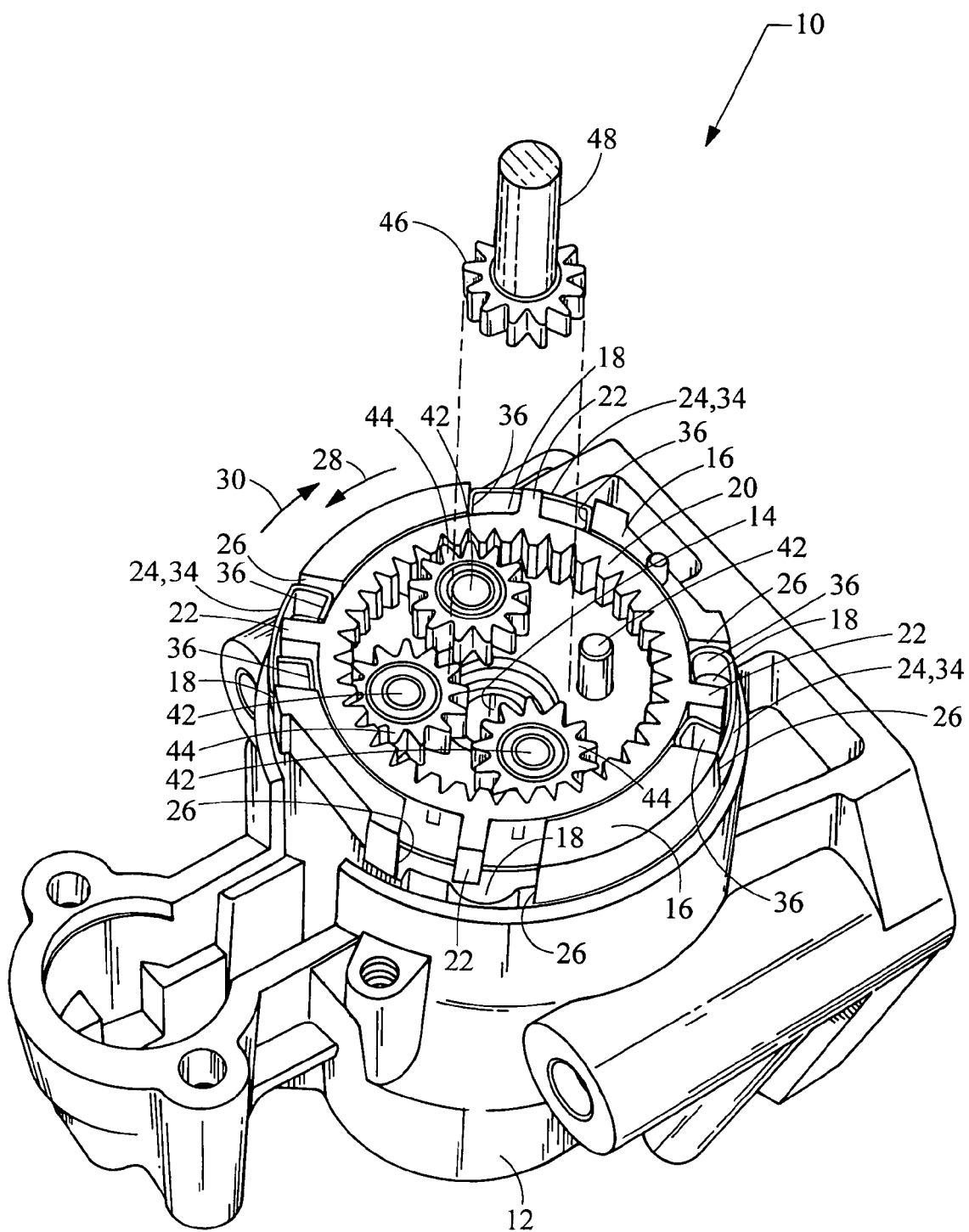
FIG. 3 is a view, similar to FIG. 1, of an alternative embodiment incorporating variable rate clip springs, that provide dampening in both rotational directions.

Referring to FIG. 3, a starter motor 10 is shown wherein a clip spring 34 is placed within each of the pockets 18 of the stationary gear base 16. For illustrative purposes, the clip spring 34 is omitted from the pocket 18, generally located at the six o-clock position in FIG. 3. The clip springs 34 include portions 36 that extend into the pockets 18 on either side of the radially extending portions 22 of the stationary gear 20. The portions are designed to flex under pressure, thereby providing dampening in either rotational direction, as indicated by arrows 28 and 30.

The variable rate dampening members 24 provide variable rate dampening such that when the starter motor 10 experiences high frequency, low amplitude oscillations the dampening members 24 provide a first spring rate and when the starter motor 10 experiences a high amplitude impact for a short duration of time, the dampening members 24 provide a second spring rate that is stronger than the first spring rate.

Oscillation caused by the dual mass flywheel of a diesel engine exists most of the time during engine cranking. The oscillation is at high frequency and at low amplitude. When the starter motor 10 is subject to this kind of oscillation, the variable rate dampening members 24 work as a soft spring with a first spring rate. Occasionally, the starter motor 10 will be subject to a large impact load, one with high amplitude for a short duration of time. This happens when the engine misfires and also during repeated cranking of the engine by the vehicle operator. When this type of high amplitude impact happens, the variable rate dampening members 24 provide a second spring rate that is stiffer than the first spring rate. In this way, the starter motor 10 provides a broad range of impact and oscillation absorption, and prevents the starter motor 10 from pre-mature or abnormal failure. A starter motor 10 incorporating the features of the present application can also be applied to gasoline type engines that have dual mass flywheels or high engine oscillation during engine cranking.

The variable rate dampening members 24, 32, 34 can also be designed to provide more than a first a second spring rate to accommodate other types of oscillations and impacts. The variable rate dampening members 24, 32, 34 can be progressive, whereby the spring rate changes correspondingly to the amplitude and frequency of the oscillations and impacts being experienced within the starter motor 10. The spring rates can be designed and customized for various applications to absorb energy based on the natural frequency of the engine.

In accordance with the provisions of the patent statutes, the starter motor described in the present application has been described in various embodiments. However, it should be noted that the invention can be practiced otherwise than as specifically illustrated and described.

What is claimed is:

1. A starter motor comprising:
   a starter motor housing; an electric motor mounted within said starter motor housing;
   a stationary gear base mounted onto said starter housing, said stationary gear base including portions defining a plurality of circumferentially spaced pockets having inner walls therein;
   a stationary gear rotatably mounted within said stationary gear base, said stationary gear including a plurality of legs radially extending into said pockets;
   a plurality of dampening members disposed within the plurality of pockets for providing dampening, wherein two respective dampening members are disposed in each respective pocket on each side of said respective leg, and at least one of said dampening members disposed within each respective pocket on either side of each respective leg is a variable rate dampening member;
   said variable rate dampening members providing variable rate dampening such that when the starter motor experiences high frequency, low amplitude oscillations said dampening members provide a first spring rate and when the starter motor experiences a high amplitude impact for a short duration of time, said dampening members provide a second spring rate that is stronger than the first spring rate.

2. The starter motor of claim 1 wherein said pockets and said legs of said stationary gear are spaced symmetrically about said stationary gear base and said stationary gear, respectively.

3. The starter motor of claim 2 wherein said stationary gear base includes four of said pockets evenly spaced circumferentially about said stationary gear base, and said stationary gear includes four of said legs evenly spaced circumferentially about said stationary gear.

4. The starter motor of claim 1 further including an output shaft, said output shaft being interconnected with said stationary gear through a planetary gear set.

5. The starter motor of claim 4 wherein said output shaft includes a plurality of axially extending pins, said planetary gear set including a plurality of planet gears, one planet gear being mounted rotatably onto each of said axially extending pins, said planet gears meshing with said stationary gear, thereby interconnecting said stationary gear to said output shaft.

6. The starter motor of claim 5 further including a sun gear positioned centrally within said planet gears and meshing with each of said planet gears, said sun gear being attached to an armature shaft of said electric motor, thereby interconnecting said electric motor to said stationary gear such that oscillations and impacts experienced by said electric motor are absorbed by said dampening members.

7. The starter motor of claim 1 wherein said variable rate dampening members are variable rate coil springs.

8. The starter motor of claim 1 wherein said variable rate dampening members are variable rate clip springs.

9. The starter motor of claim 1 wherein a single variable rate dampening member is positioned within each of said pockets adjacent one side of each of said legs of said stationary gear thereby providing dampening in a single rotational direction.

10. The starter motor of claim 1 wherein a pair of variable rate dampening members are positioned within each of said pockets and on opposite sides of each of said legs of said stationary gear thereby providing dampening in both rotational directions.

11. The starter motor of claim 1 wherein a unitary variable rate dampening member is positioned with portions on opposite sides of each of said legs of said stationary gear thereby providing dampening in both rotational directions.

12. The starter motor of claim 1 wherein said variable rate dampening members are progressive in nature, whereby the spring rate of the variable rate dampening member changes correspondingly to the nature of the impact of oscillation being dampened.

* * * * *